July 15, 1952 G. E. DATH 2,603,478

SHOCK ABSORBER FOR RAILWAY CAR TRUCKS

Filed April 9, 1949 2 SHEETS—SHEET 1

Inventor:
George E. Dath.
By
Henry Fuchs
Atty.

July 15, 1952 G. E. DATH 2,603,478
SHOCK ABSORBER FOR RAILWAY CAR TRUCKS
Filed April 9, 1949 2 SHEETS—SHEET 2

Inventor:
George E. Dath.
By Henry Fuchs
Atty.

Patented July 15, 1952

2,603,478

UNITED STATES PATENT OFFICE 2,603,478

SHOCK ABSORBER FOR RAILWAY CAR TRUCKS

George E. Dath, Mokena, Ill., assignor to W. H. Miner, Inc., Chicago, Ill., a corporation of Delaware Application April 9, 1949, Serial No. 86,426

5 Claims. (Cl. 267—9)

This invention relates to improvements in shock absorbers, especially adapted for use as snubbing devices in connection with springs of railway car trucks.

One object of the invention is to provide a snubber for truck springs of railway cars, in the form of a friction shock absorbing mechanism, comprising a friction casing, friction shoes slidingly telescoped within the casing, a split friction post interposed between the shoes and by which the shoes are carried for sliding movement with respect to the casing, spring means yieldingly opposing relative movement of the post and casing toward each other, and a rubber core under compression between the parts of the split post for expanding the post and pressing the shoes into tight frictional engagement with the interior walls of the casing.

Other objects of the invention will more clearly appear from the description and claims hereinafter following.

Figure 1:
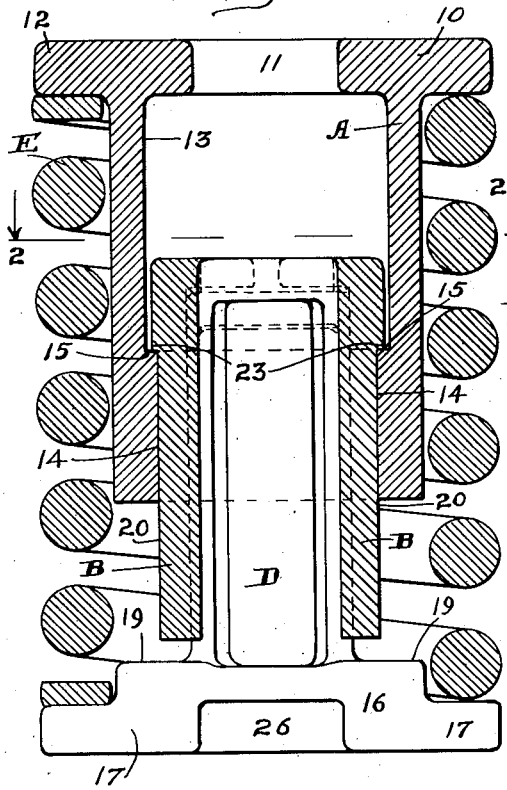
Figure 3:
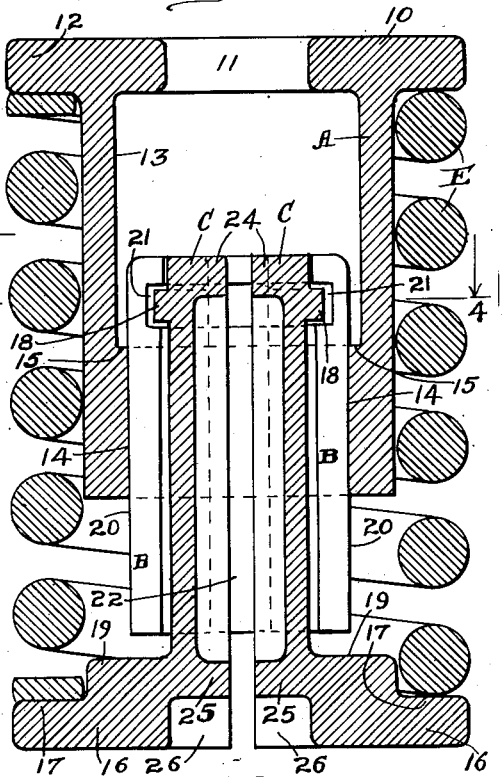
Figure 2:
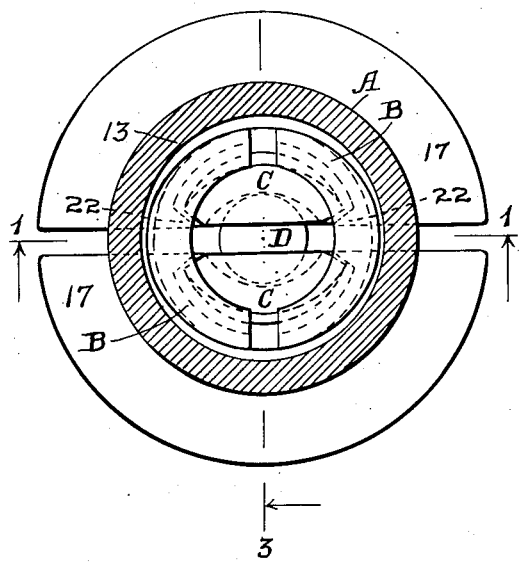
Figure 4:
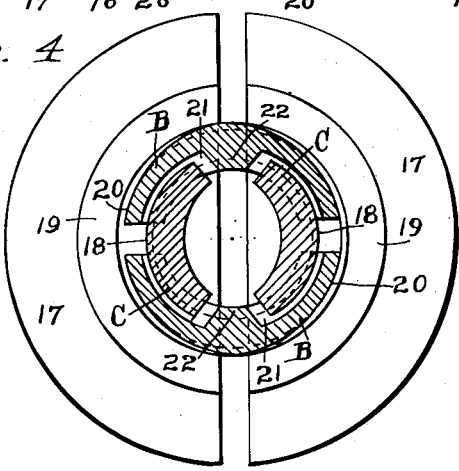
Figure 5:
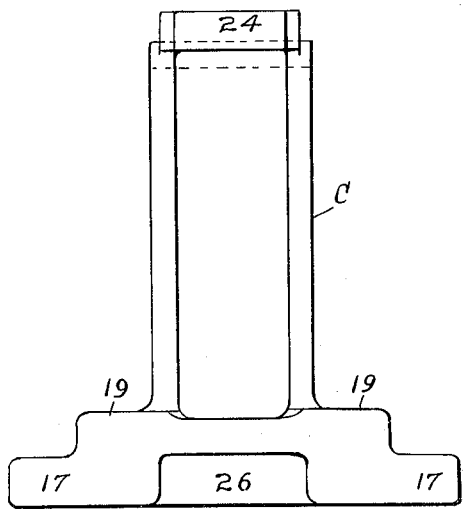
Figure 7:
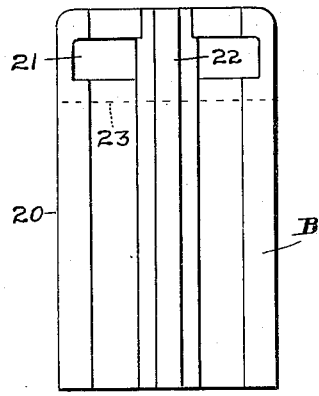
Figure 6:
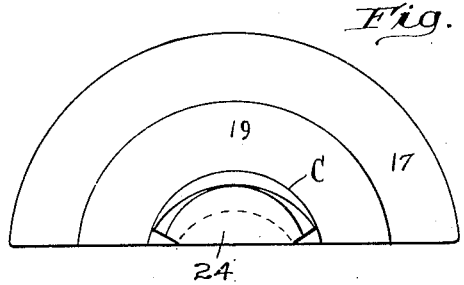
Figure 8:
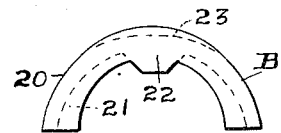

In the accompanying drawings forming a part of this specification, Figure 1 is a vertical sectional view of the improved snubber, said section corresponding substantially to the line 1—1 of Figure 2. Figure 2 is a horizontal sectional view, corresponding substantially to the line 2—2 of Figure 1, with the spring omitted. Figure 3 is a transverse vertical sectional view, corresponding substantially to the line 3—3 of Figure 2, with the rubber core omitted. Figure 4 is a horizontal sectional view, corresponding substantially to the line 4—4 of Figure 3, with the friction casing, rubber core, and spring omitted. Figure 5 is an elevational view of the right hand section of the post shown in Figure 3, looking from left to right in said figure. Figure 6 is a top plan view of Figure 5. Figure 7 is an elevational view of the right hand friction shoe shown in Figure 1, looking from left to right in said figure. Figure 8 is a top plan view of Figure 7.

As illustrated in the drawings, my improved snubber or shock absorber comprises broadly a friction casing A, a pair of friction shoes B—B, a two-piece, vertically split post C, a rubber core D embraced between the two parts of the vertically split post C, and a spring resistance E.

The friction casing A is in the form of a substantially cylindrical, tubular member, open at the bottom or inner end and having a transverse end wall 10 at its outer or upper end, said wall being provided with a central opening 11. The wall 10 projects outwardly beyond the body portion proper of the casing, providing a laterally projecting, annular flange 12, which forms an abutment for the upper end of the spring resistance E. The casing A is of enlarged internal diameter at its upper end, as indicated at 13, and the remaining section of the casing outwardly or below said enlarged, interior section provides transversely curved, interior friction surfaces 14—14 with which the shoes B—B cooperate. The interiorly enlarged portion of the casing provides transverse stop shoulders 15—15 at the inner ends of the friction surfaces 14—14, for a purpose hereinafter described.

The post C is vertically split, that is, it is composed of two similar sections 16—16. The two sections 16—16 of the post are of substantially the same design, each comprising a main body portion having a laterally projecting, horizontal base flange 17, which serves as an abutment or follower for the lower end of the spring resistance E. The body portion of each section 16 of the post C is of generally curved, transverse cross section, as clearly shown in Figures 2, 4, and 6, and presents a transversely curved outer surface. Adjacent the upper end thereof, each section 16 is provided with a laterally outwardly projecting, arcuate flange 18, adapted to interlock with the shoes B—B to hold the same against lengthwise movement with respect to the post. The base flange 17 of each section of the post is provided with a raised portion or bosslike member 19 at the lower end of the section, which extends into the lower end of the spring E and acts as a centering member. As clearly shown in Figures 1 and 3, the sectional post C extends into the casing A and the shoes B—B embrace the post, being interposed between the same and the interior friction surfaces 14—14 of the casing.

The two friction shoes B—B are of similar design, each being in the form of a transversely curved, relatively heavy, platelike member, presenting an outer friction surface 20, corresponding in curvature to the interior friction surface 14 of the casing A and slidingly engaging the same. The shoes B—B embrace the split post C at opposite sides, the longitudinal central axis of each shoe being arranged in substantial alignment with the dividing plane of the post C. Each shoe thus laterally overlaps both sections 16—16 of the post. Adjacent the upper end thereof, each shoe B has a pair of transversely extending, interior grooves, forming seats 21—21, extending oppositely from a central wall 22. The seats 21—21 of the shoes B—B receive the flanges 18—18 of the sections 16—16 of the post C to lock the shoes against lengthwise movement with respect to the post. As shown in Figures 1 and 2, the shoes B—B terminate short of the bosslike members 19—19 of the base flanges 17—17 of the sections of the post C. The upper ends of the shoes B—B are laterally outwardly enlarged to provide horizontally disposed, transversely extending stop shoulders 23—23 adapted to engage the shoulders 15—15 of the casing to limit lengthwise vertical separation of the casing and shoes B—B.

The rubber core D occupies the space between the sections 16—16 of the post C and holds the latter expanded to press the shoes apart against the friction surfaces of the casing. The core D is under initial compression in the assembled condition of the parts of the mechanism, and inturned flanges 24—24 and 25—25 at the top and bottom ends, respectively, of the sections of the post confine the core against vertical displacement with respect to the post.

The spring resistance E is in the form of a coil spring member surrounding the casing A and having its top and bottom ends bearing, respectively, on the flange 12 of the casing A and the flanges 17—17 of the sections 16—16 of the post C.

As will be understood by those skilled in this art, the snubbing device shown in the drawings is substituted for one of the spring coils or sets of coils of a cluster of truck springs of a railway car, and cooperates with the top and bottom spring follower plates of the spring cluster, the usual spring centering projection of the top spring follower plate being accommodated within the opening 11 in the top wall of the casing A, and the spring centering projection on the bottom spring follower plate being accommodated in recesses or seats 26—26 provided in the base flanges 17—17 of the split post C. The snubbing device is thus subjected to compression between the body and truck bolsters of the railway car, together with the other springs of said cluster.

In the operation of my improved snubber, upon the springs of the spring cluster of the truck of a railway car being compressed, the friction shoes B—B will be forced inwardly of the friction casing A opposed by the spring E. Due to the friction existing between the shoes and the friction surfaces of the casing A, relative movement of these parts is frictionally opposed and the action of the springs of the cluster effectively snubbed. When the coils of the truck spring cluster expand and the spring follower plates of said cluster are moved apart, the friction shoes B—B and the casing A will also be forced apart by the expansive action of the spring E, which reacts against the flange 12 of the casing A and the flanges 17—17 of the sections 16—16 of the split post C.

I claim:

1. In a friction shock absorber, the combination with a friction casing having opposed, interior, lengthwise extending friction surfaces; of a follower at the outer end of the casing; a two-piece, lengthwise split post movable lengthwise with respect to the casing; a follower at the outer end of each section of the post; a pair of lengthwise extending, opposed friction shoes interposed between said split post and the friction surfaces of the casing, each of said shoes overlapping both pieces of said two piece post; a rubber core under compression between the sections of said post; and spring means interposed between the followers of said casing and post; yieldingly opposing lengthwise movement of the casing and post toward each other.

2. In a friction shock absorber, the combination with a friction casing having opposed, interior, lengthwise extending friction surfaces; of a follower at one end of the mechanism rigid with said casing; a friction unit slidingly telescoped within the casing; followers at the other end of the mechanism rigid with said unit, said unit including a two part, lengthwise split post, friction shoes embracing the post on opposite sides and having sliding engagement with the friction surfaces of the casing, each of said shoes overlapping both parts of said two piece post, and interlocking means of flange and groove formation on said post and shoes for holding the shoes against lengthwise movement with respect to the post; a rubber core under compression between said parts of the post; and spring means bearing on opposite ends on said followers yieldingly opposing lengthwise movement of the post and casing toward each other.

3. In a friction shock absorber, the combination with a friction casing having opposed, interior, lengthwise extending friction surfaces at one end; of a follower at the other end of said casing; a lengthwise divided post comprising a pair of similar sections having laterally outwardly projecting followers at their outer ends; a pair of opposed friction shoes interposed between the friction surfaces of the casing and said split post, each of said shoes laterally overlapping both sections of the post, said shoes and sections of said posts having locking means of tongue and groove formation for holding said shoes against lengthwise movement with respect to the post; a rubber core under lateral compression between the sections of said post; and spring means bearing at opposite ends on the follower of the casing and the followers of said sections of the post for yieldingly opposing lengthwise movement of the casing and post toward each other.

4. In a friction shock absorber, the combination with a cylindrical friction casing having opposed, interior, transversely curved friction surfaces at its inner end extending lengthwise of said casing; of a follower at the outer end of said casing; a lengthwise split post movable lengthwise with respect to the casing, said post comprising two similar, transversely curved sections, each section having a follower at its outer end; a pair of opposed, transversely curved friction shoes interposed between said split post and the friction surfaces of the casing; an inwardly projecting, lengthwise extending wall on each shoe engaged between the opposed side edges of the sections of said post; a rubber core under compression between the sections of the post; and spring means bearing at opposite ends on said follower of the casing and said followers of the split post for yieldingly opposing lengthwise movement of the post and casing toward each other.

5. In a friction shock absorber, the combination with a cylindrical friction casing having opposed, interior, transversely curved friction surfaces at one end extending lengthwise of said casing; of a follower at the opposite end of said casing; a lengthwise split post movable lengthwise with respect to the casing, said post comprising two similar, transversely curved sections, each section having a follower at its outer end; a pair of opposed, transversely curved friction shoes interposed between said split post and the friction surfaces of the casing; a lengthwise extending, inwardly projecting wall on each shoe extending between opposite side edges of adjacent shoes; interlocking means on said post and shoes for holding said shoes against movement lengthwise of said post; a rubber core under compression between the sections of the post; and spring means bearing at opposite ends on said follower of the casing and the followers of the sections of said post for yieldingly opposing lengthwise movement of the post and casing toward each other.

GEORGE E. DATH.

REFERENCES CITED

The following references are of record in the file of this patent:

UNITED STATES PATENTS

| Number | Name | Date |
|---|---|---|
| 1,985,369 | Fuchs | Dec. 25, 1934 |
| 2,199,145 | Watson | Apr. 30, 1940 |
| 2,216,231 | Dentler | Oct. 1, 1940 |
| 2,381,404 | Cottrell | Aug. 7, 1945 |